INVENTOR
K. W. STEINBUCH

BY *R P Morris*

ATTORNEY

METHOD FOR THE AUTOMATICAL RECOGNITION OF CHARACTERS

Filed April 15, 1958 11 Sheets-Sheet 2

INVENTOR.
K.W. Steinbuch
BY R P Morris

INVENTOR.
K.W. Steinbuch

BY R P Morris

INVENTOR.
K.W. Steinbuch

BY R P Morris

INVENTOR.
K.W. Steinbuch
BY R P Morris

April 30, 1963 K. W. STEINBUCH 3,088,096

METHOD FOR THE AUTOMATICAL RECOGNITION OF CHARACTERS

Filed April 15, 1958 11 Sheets-Sheet 6

INVENTOR.
K.W. Steinbuch

BY R.P. Morris

INVENTOR.
K.W. Steinbuch
BY R P Morris

METHOD FOR THE AUTOMATICAL RECOGNITION OF CHARACTERS

Filed April 15, 1958 11 Sheets-Sheet 8

INVENTOR
K.W.Steinbuch

BY R P Morris

ATTORNEY

INVENTOR
K.W. Steinbuch

BY R P Morris

ATTORNEY

April 30, 1963 K. W. STEINBUCH 3,088,096

METHOD FOR THE AUTOMATICAL RECOGNITION OF CHARACTERS

Filed April 15, 1958 11 Sheets-Sheet 10

INVENTOR.
K.W. Steinbuch

BY R P Morris

METHOD FOR THE AUTOMATICAL RECOGNITION OF CHARACTERS

Filed April 15, 1958 11 Sheets-Sheet 11

INVENTOR.
K.W. Steinbuch

BY R P Morris 3,088,096
Patented Apr. 30, 1963

3,088,096

METHOD FOR THE AUTOMATICAL RECOGNITION OF CHARACTERS

Karl Wilhelm Steinbuch, Fellbach, Germany, assignor to International Standard Electric Corporation, New York, N.Y., a corporation of Delaware Filed Apr. 15, 1958, Ser. No. 728,732
Claims priority, application Germany Apr. 17, 1957
21 Claims. (Cl. 340—146.3)

Figure 1:
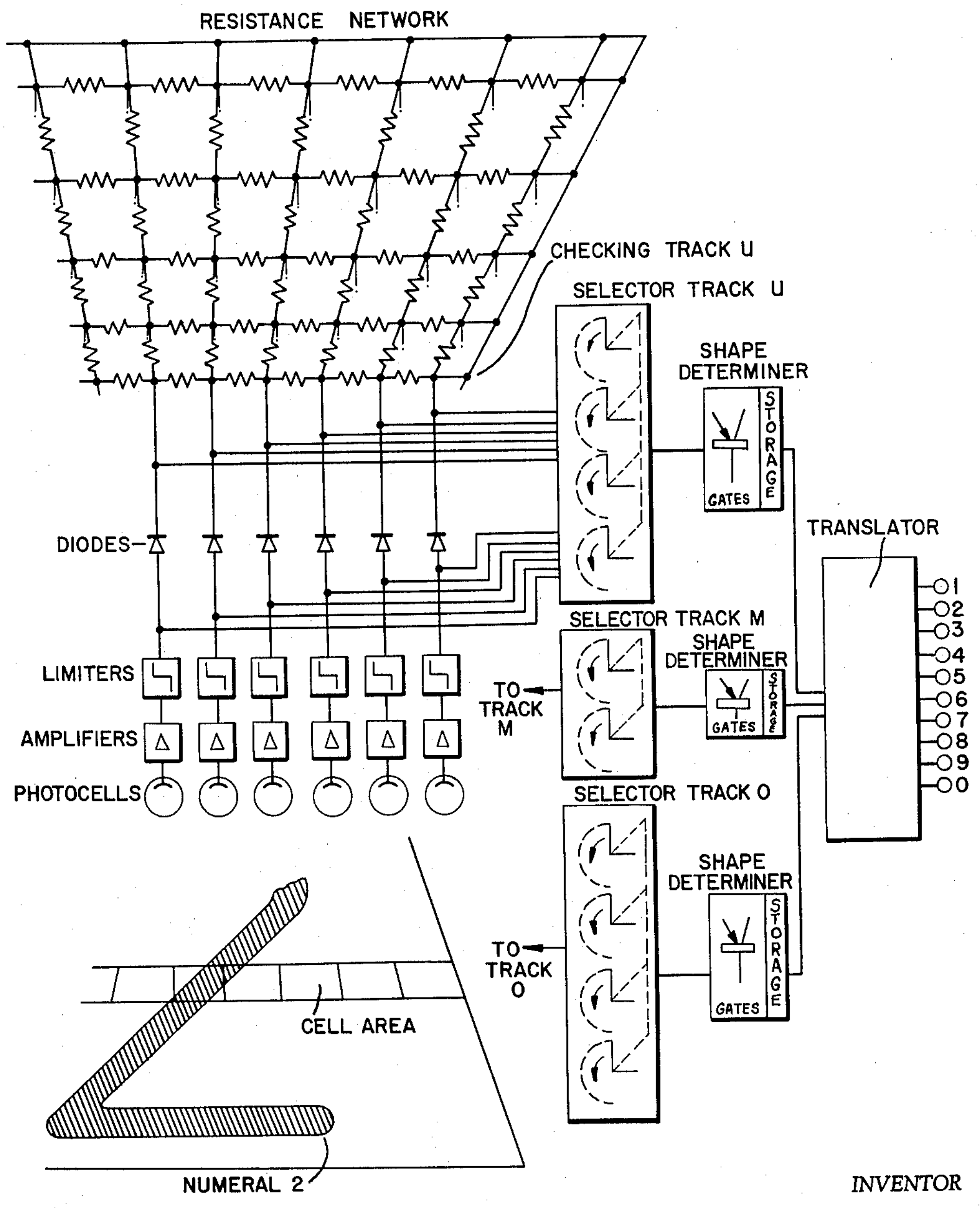

This invention relates to an automatic character recognition method.

In the course of applying automation to calculating and similar processes it is in many cases desirable that visually readable characters are also directly mechanically readable in order to control the corresponding equipments in the data-processing systems. This desire has led to many proposals concerning the mechanical reading of letters and figures.

In some of the conventional methods the characters are scanned photo-electrically along certain horizontal and/or vertical lines, thus determining the black-white transitions. By suitably selecting the scanning lines electrical characteristics for the individual characters will result, representing a definite code of the respective character. Of course, this encoding is entirely arbitrary and therefore, as a rule, also difficult to survey. Instead of the optical scanning it has also been proposed to print the characters with an electrically conductive or magnetic ink, or the like, and to carry out the scanning along predetermined lines with the aid of corresponding sensing elements.

Another conventional scanning method consists in determining the black contents within the type field. This, however, may result under certain circumstances, in characteristics or criterions for the individual characters, which are very difficult to distinguish. A third method for recognizing characters operates on the basis of the comparison of characters with standard, stored characters. Generally, however, this method requires a large amount of equipment.

Finally, there is another method, according to which the line traces of the characters are utilized as distinguishing characteristics. In this method, however, one faulty interruption in the trace of the line of the characters will have a very disturbing effect. To avoid faulty evaluations very complicated processes are usually required for determining that the line interruption is actually not due to the character itself.

Furthermore the conventional methods generally bear the disadvantage of being sensitive to changes in size, displacements or twistings (distortions) of the characters. The aforementioned disadvantages are largely eliminated by the novel method, in that this method, within wide limits, is invariable or unaffected by the aforementioned alterations or variations.

An object of the invention is a method for the automatic recognition of characters in particular of letters and figures. According to the invention the characters to be recognized are electrically simulated in a field of potential and the then resulting field of potential is evaluated.

The field of potential may be suitably approximated in an electrical network, which for example, consists of a network of concentrated impedances disposed in coordinate rows and columns. The crossing points of the impedances, which may either be simple or complex, will then be acted upon by a fixed potential in accordance with the shape of the characters. When the periphery of the network is held at another fixed potential, a potential field and current flow depending upon the shape of the scanned character will appear. Therefore, the measurement of the potential difference at definite points of the network, may be utilized as a characteristic for the recognition of the characters.

By way of example, the simulation of the characters in the resistor network may be effected in that the characters are scanned in a raster-shaped manner by one or more photocells, and that to each partial surface of the raster ($b_{x,\,y}$) one point ($P_{x,\,y}$) of the network is assigned, and that to those points ($P_{x,\,y}$) whose associating partial area or surface ($b_{x,\,y}$) either exceeds or undercuts a predetermined blackening, a voltage $U_0$ is impressed.

A further embodiment of the invention consists in that the characters are divided in such shape elements that the potential conditions, which are caused by these elements, can easily be evaluated for recognizing the characters; it may then be possible to restrict the evaluation to some very distinct horizontal or vertical lines. This, in turn, brings about a simplification of the evaluating methods and evaluating circuit arrangements. The characters may be divided in such a way that the shape elements are unambiguously determined by the formation of the spatial derivatives of the first and second and probably even higher order of the potential values measured along the scanning lines, so that these may be assigned to the characters in a corresponding arrangement.

In elaborating upon this idea it is possible to recognize the numerals 0 . . . 9 by dividing them in three different shape elements, namely in a shape element that is open toward the left, hereinafter symbolically indicated by L, in one that is open toward the right, indicated by R, and in one that is closed, indicated by G, and in that the measuring of the field of potential is accomplished along three horizontal lines of reference, which are common to all figures. In the course of this it is sufficient to set up the first and the second derivative, which may be approximated in that the potentials are determined at three points in the direction of scanning on each of the three scanning lines, and are brought into a corresponding relation with respect to one another. The shape elements and, consequently, the numerals, may then be unambiguously recognized by bringing the scanning results separately for each scanning trace for the shape element L into the relations $$U_{x+1}>U_x>U_{x-1}$$

and $$U_x>\tfrac{1}{2}(U_{x+1}+U_{x-1})$$

for the shape element R into the relations $$U_{x-1}>U_x>U_{x+1}$$

and $$U_x>\tfrac{1}{2}(U_{x+1}+U_{x-1})$$

and finally for the shape element G into the relations $$U_x=U_0$$
$$U'_x<U_0$$

wherein $U'_x$ indicates the photocell output potential of the respective partial area of surface $b_{x,\,y}$, $U_x$ the potential appearing at point $P_{x,\,y}$ of the potential field, and $U_0$ the potential imprinted upon the point $P_{x,\,y}$.

Figure 1A:
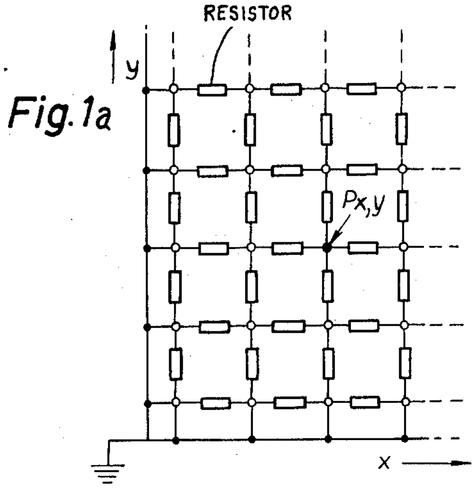
Figure 2:
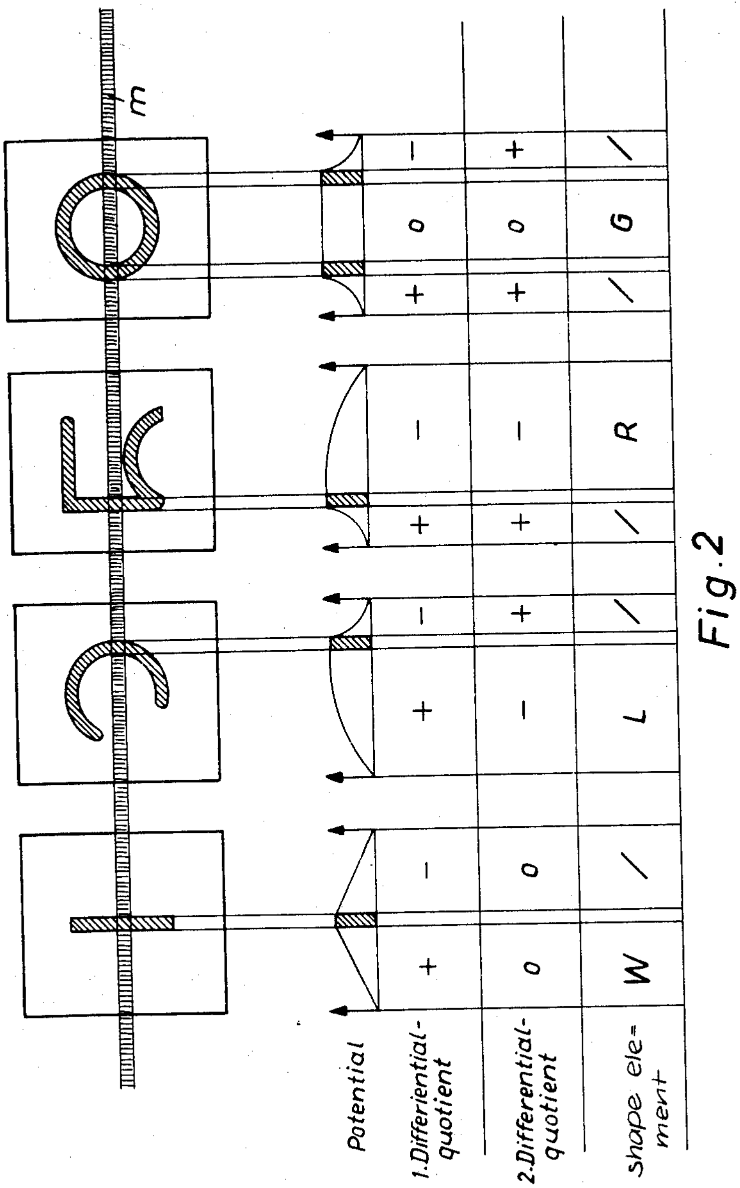
Figure 3:
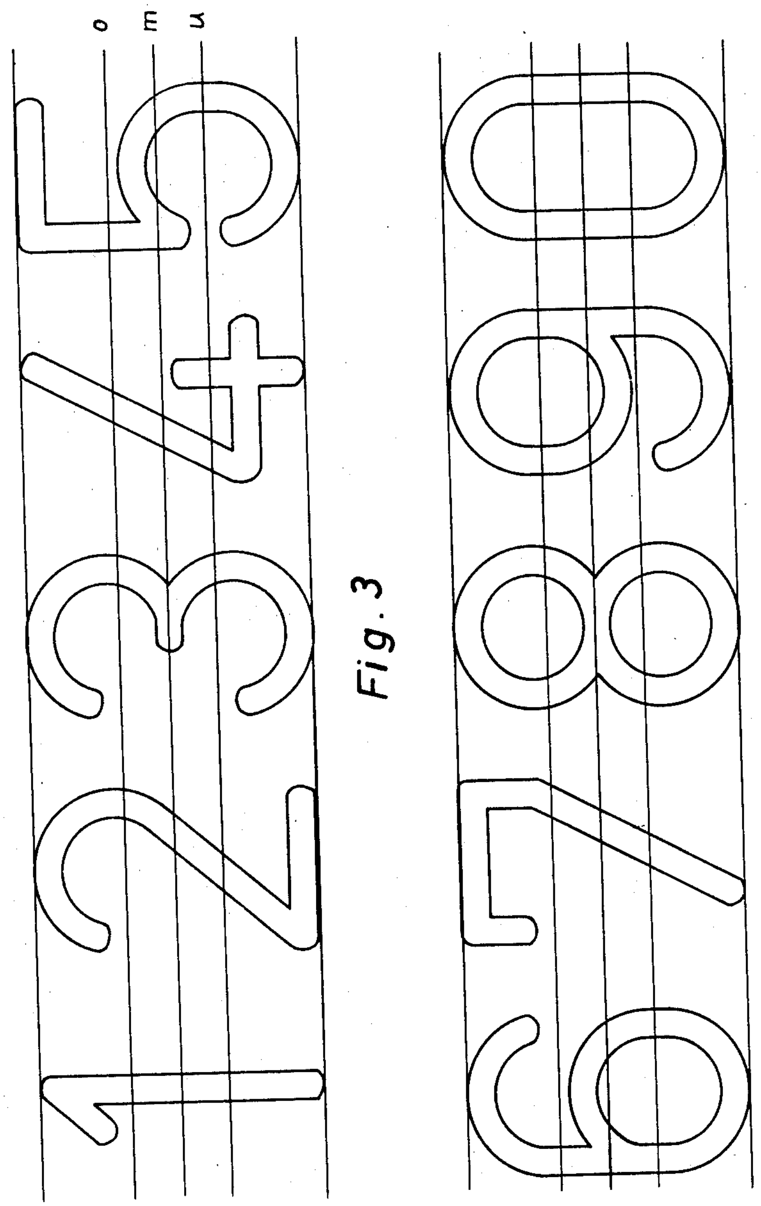

The invention as well as further advantages and features thereof will be described in the following by way of example and with reference being had to FIGS. 1 through 14 of the copending drawings, in which:

FIG. 1 is a general layout of one embodiment of the invention as shown in FIGS. 1*a*–12, FIG. 1*a* shows a resistor arrangement for the approximate simulation of a potential field, FIG. 2 shows some shape elements as well as the potential condition thereof within the potential field, FIG. 3 shows the numerals 1 . . . 9, 0 with the checking tracks *o*, *m* and *u* for determining the shape elements L, R, G, and W.

Figure 14:
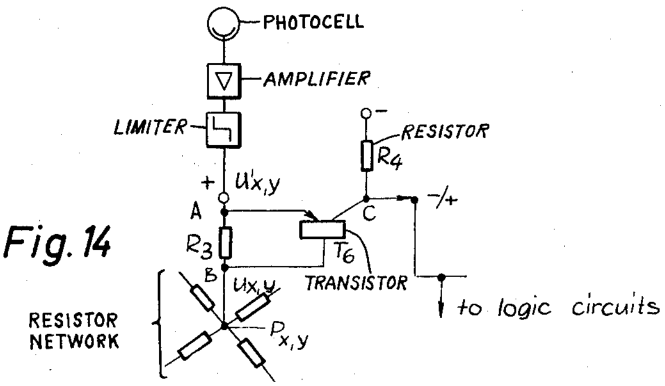
Figure 8:
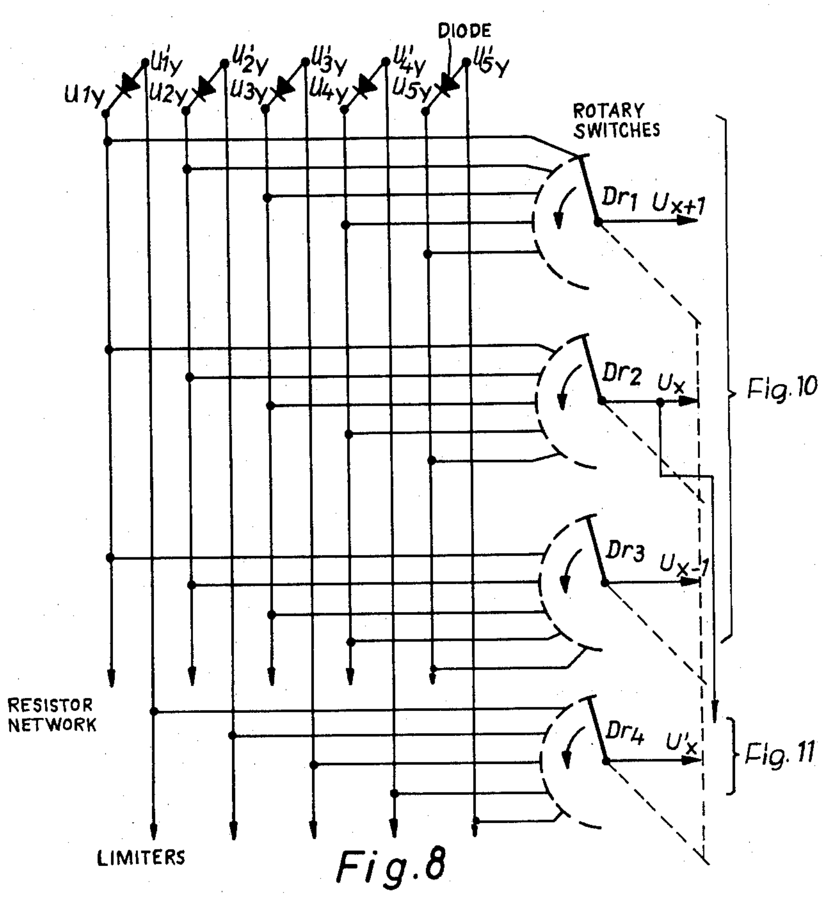
Figure 4:
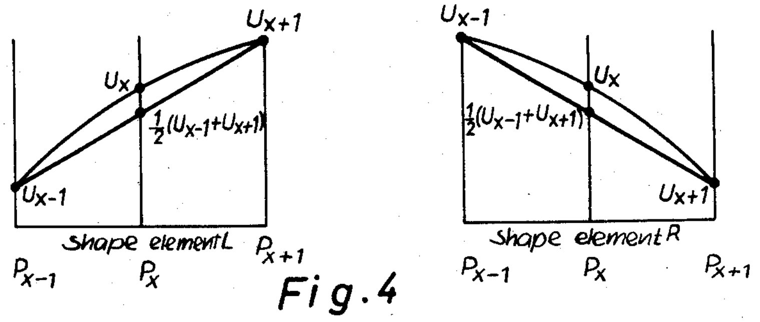
Figure 5:
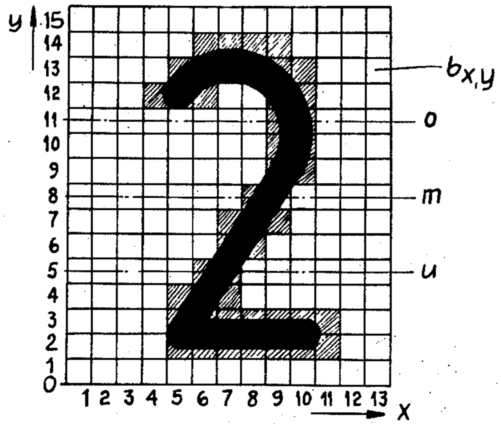
Figure 6:
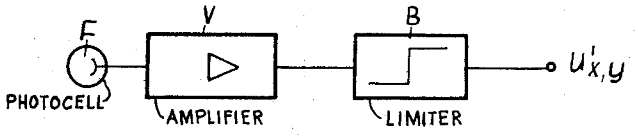
Figure 7:
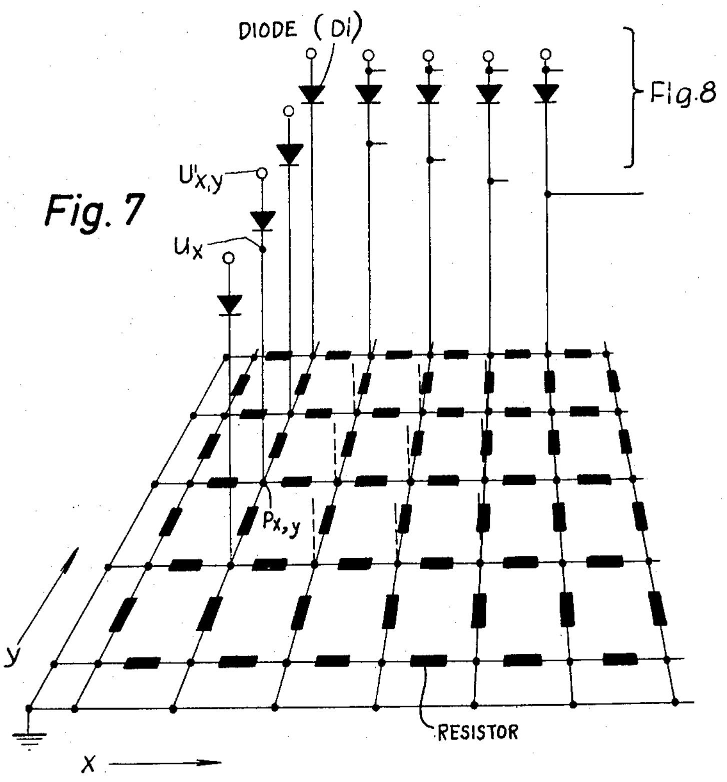
Figure 9:
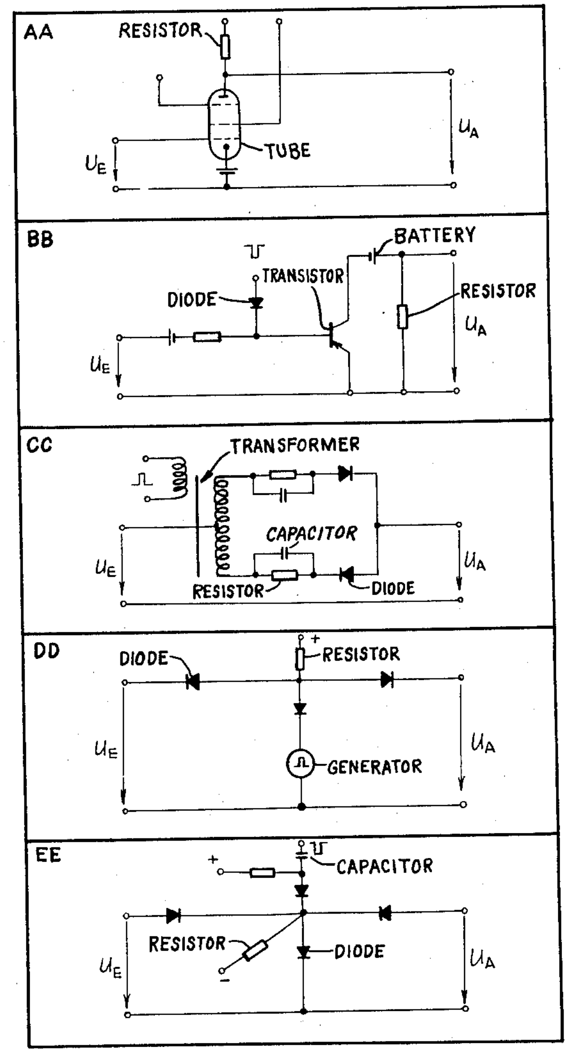
Figure 10:
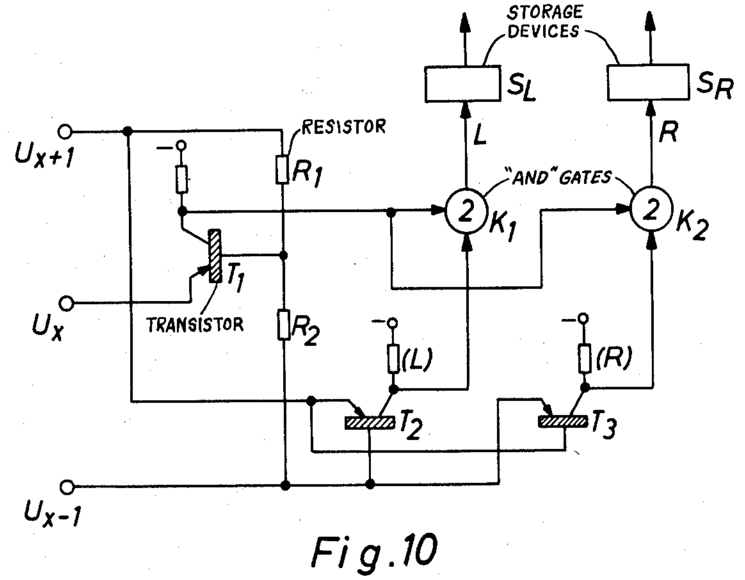
Figure 11:
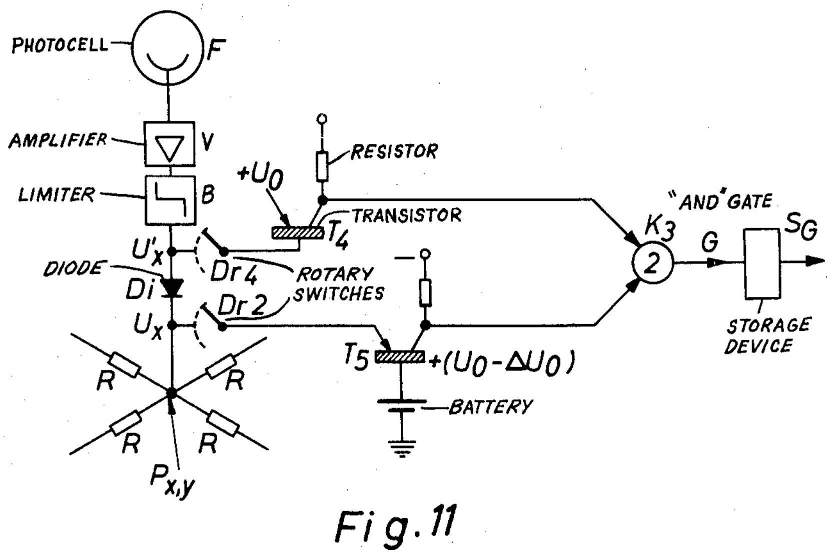
Figure 12:
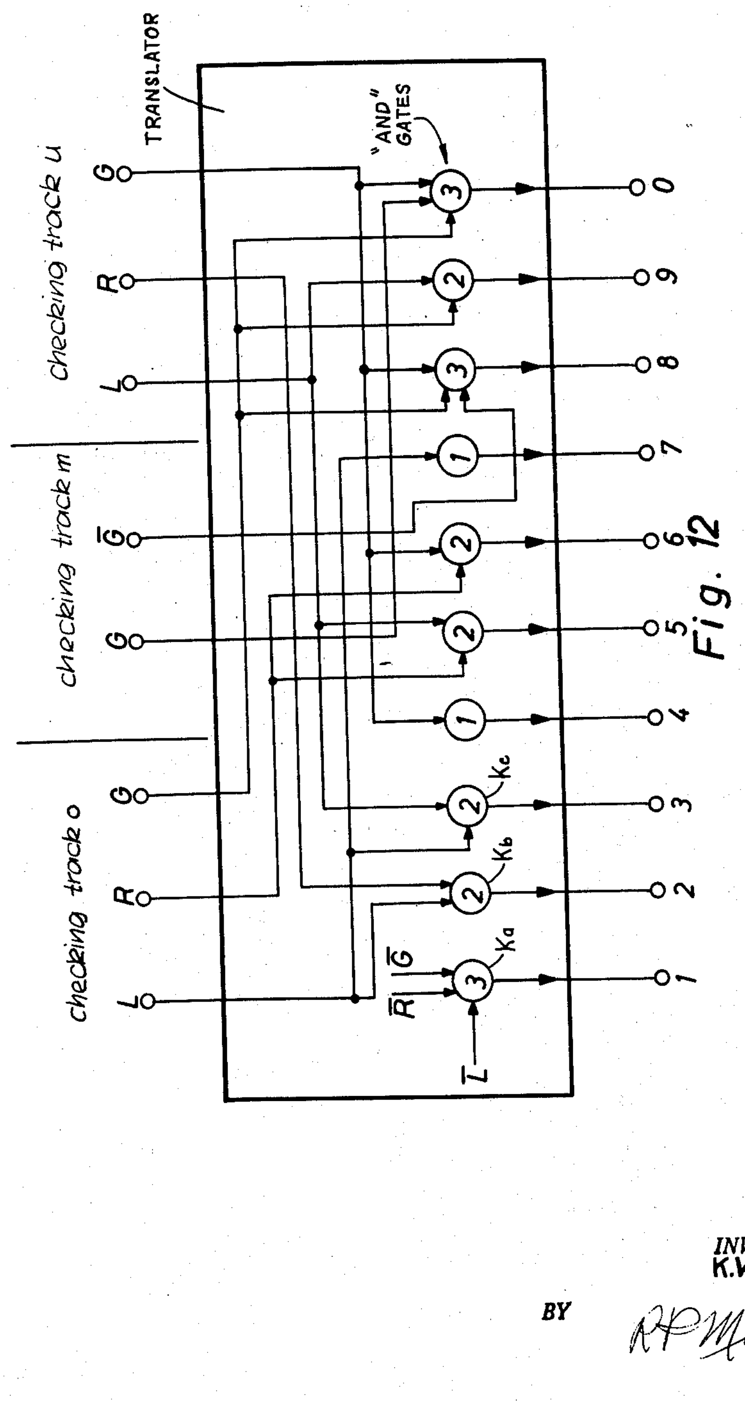
Figure 13:
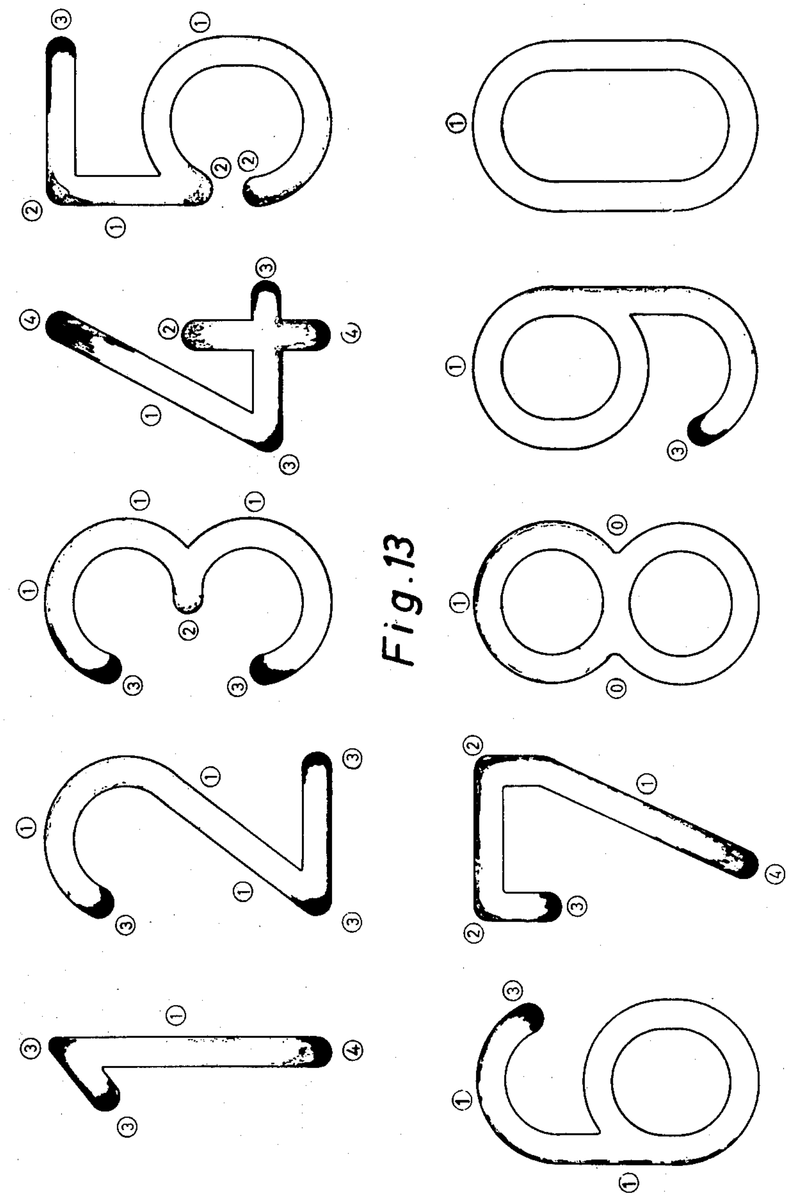

FIG. 4 shows the potentials at three points of the resistor arrangement immediately successive in the $x$-direction with the potentials for the shape elements L and R, FIG. 5 shows the FIGURE 2 within a raster pattern for the area quantizing of the scanning, FIG. 6 shows a photocell amplifier/limiter arrangement serving both the scanning of the raster pattern and the digitizing of the scanning, FIG. 7 shows a resistor arrangement with a diode input of the output-signals of the photocell arrangement according to FIG. 6, FIG. 8 shows a selector arrangement for checking the potential field at three points of the resistor arrangement immediately successive in the $x$-direction, FIG. 9 shows five varieties of electronic gates which may be used for the selectors $Dr_1 \ldots Dr_4$ according to FIG. 8, FIG. 10 shows a circuit arrangement for determining the shape elements L and R according to the output-signals of selectors $Dr_1 \ldots Dr_3$, in FIG. 8;

FIG. 11 shows a circuit arrangement for determining the shape element G according to the output-signals of the selectors $Dr_2$ and $Dr_4$, in FIG. 8;

FIG. 12 shows a translator for evaluating and translating the output-signals $S_L$, $R_R$ and $S_G$ from FIGS. 10 and 11 to the numerals 0 . . . 9, FIG. 13 shows the numerals 1 . . . 9, 0 with the current stages; and FIG. 14 shows a circuit arrangement for measuring the current flowing into a point $P_{x,\,y}$.

Prior to explaining the invention it is appropriate to consider some facts regarding the potential theory as well as the recognitions on which the invention is based (cf. e.g. Küpfmüller, "Einführung in die theoretische Elektrotechnik," chapter III/6; Proc. IEE, vol. 96, page 163, vol. 98, page 486; Proc. IRE, August 1952, page 970; Proc. IEE, vol. 101, part II, page 349 et seq.).

The potential field of a plane plate (or matrix: a matrix being, insofar as we are interested here, a two or three dimensional body in which a field is capable of being developed) of uniform electric conductivity depends upon the field margins existing therein, when assuming that at infinity the potential zero exists, and at the field margins a predetermined constant potential $U_0$. In this way the potential is determined at each point by the geometrical shape of the field margins. On the other hand, the measuring of the potential and of its spatial differential quotient at any point permits one to arrive at unambiguous conclusions as to the geometrical shape of the margins. It is to be noted that precise derivatives are not necessarily requisite; potential changes are also indicative of the field slope and what is sought is a field gradient (which, broadly speaking, includes either of the above) that may be utilized to determine the shape of the field margins.

With the aid of conventional circuit elements a plane field of flow as is the case with the electrolytic tank cannot be realized but a useful approximation thereof may be obtained.

FIGURE 1 is a general layout of one embodiment of the invention, as shown in FIGS. 1$a$ through 12.

The character to be scanned is the numeral 2, shown in the lower left-hand side of the figure. The photocells convert discrete black-white areas of the figure into electric energy which is amplified, limited and then passed on to coordinate points of a resistor matrix through the diodes, as shown. Since the resistor network has its periphery grounded, the potentials impressed upon the coordinate points will create a field of potentials throughout the network.

The network is now scanned along three tracks $u$, $m$ and $o$. In track $u$, for example, successive coordinate points in the matrix in the X direction are sampled to determine the potential gradient of the field. Since this gradient is quite dependent upon the concentration of potentials it may be analyzed in the shape determiner, shown in the figure, which then stores 1 of 3 possible conditions; shape opened to the left, shape opened to the right, and shape closed. The results stored in each of the three shape determiners corresponding to the three tracks are then led to a translator which, through a series of gate circuits, sets a potential on one of the ten wires, 1 through 0.

Referring now to FIG. 1$a$ there is shown a simple approximation obtainable by means of a coordinated arrangement of resistors. In this case the resistors do not necessarily need to be real, in some cases complex resistors are likely to be of advantage. The potential $U_0$ of the field margins is in this case fed to the intersecting points $P_{x,\,y}$.

FIG. 2 shows some field margins which may be part of the numerals 0 . . . 9 to be recognized. In the first line beneath the illustrations of the field margins there are shown the potentials which are capable of being adjusted and, consequently, measured e.g. along the checking track $m$, corresponding to a number of resistors of FIG. 1$a$. In the second and third line there are respectively given the first and the second differential quotient. According to these differential quotients the margins are divided into the four shape elements W, L, R and G. These letters are assigned to the following geometrical shapes:

$W$=straight margin,
$L$=margin opened towards the left,
$R$=margin opened towards the right, and
$G$=closed margin.

The invention is now based on the further recognition that these shape elements may be assigned to the ten numerals 0 . . . 9 in such a way that an unambiguous recognition of the numerals will be rendered possible. To this end, however, one checking track is not sufficient, but at least three of them are required.

FIG. 3 shows the numerals 0 . . . 9 with the three checking tracks $o$, $m$, and $u$. Each checking track is assigned to one line of resistors of FIG. 1$a$.

TABLE I

*Checking Tracks*

| Numeral | upper | middle | lower |
|---|---|---|---|
| 1 | $\bar{L}$, $\bar{R}$, $\bar{G}$ | | $\bar{L}$, $\bar{R}$, $\bar{G}$. |
| 2 | L | | R. |
| 3 | L | | L. |
| 4 | | | G. |
| 5 | R | | L. |
| 6 | R | | G. |
| 7 | L | | |
| 8 | G | $\bar{G}$ | G. |
| 9 | G | | L. |
| 0 | G | G | G. |

Table I shows the shape elements respectively resulting on the three checking tracks with respect to the numerals 1 . . . 9 and 0. From this it may be seen that the numerals can be unambiguously recognized from the shape elements. Further it will be seen that the numeral 1 can be determined by the absence of the shape elements L, R, and G (indicated in the Table I by $\bar{L}$, $\bar{R}$, $\bar{G}$) on all of the three checking tracks, so that the shape element W is not required for the numeral recognition, because it is not present in the other numerals. Finally it will be seen from Table I that the middle checking track $m$ is only necessary for the distinguishing the two numerals 0 and 8.

As a result of these theoretical considerations it is concluded: the characters to be recognized, and which are simulated in the potential field, can be imagined to be composed of shape elements by which characteristic potential conditions are produced in the potential field;

accordingly, the shape elements may be determined from the potential field and assigned to the characters.

FIG. 4 shows curves of the potential conditions of the shape elements L and R, resulting e.g. between the three discrete points $P_x$, $P_{x-1}$ and $P_{x+1}$, at which the potential values $U_x$, $U_{x-1}$ and $U_{x+1}$ exist. Thereupon the following criteria may be read.

For shape element L:

(1) $$U_{x+1}>U_x>U_{x-1}$$

and (2) $$U_x>\tfrac{1}{2}(U_{x-1}+U_{x+1})$$

For shape element R:

(3) $$U_{x-1}>U_x>U_{x+1}$$

(4) $$U_x>\tfrac{1}{2}(U_{x-1}+U_{x+1})$$

The shape element G, as likewise results from the potential condition according to FIG. 2, is determined by (5) $$U_x=U_0$$

and (6) $$U'_x<U_0$$

($U'_x$ will be described hereinafter.)

In the case of a closed field margin the same potential within the potential field exists at all points within the margin, e.g. $U_x=U_0$.

By means of these six conditions the three shape elements L, R, and G are unambiguously defined and, consequently, capable of being determined.

Following these theoretical considerations the invention will now be described in particular with reference to FIGS. 5–12.

SCANNING OF THE RASTER PATTERN AND SIMULATION OF THE NUMERALS WITHIN THE POTENTIAL FIELD

Hence, according to the above, at first the numeral has to be scanned and the resulting potential values have to be imprinted upon the field. Since the resistor arrangement as shown in FIG. 1*a* is used as a field an area quantizing there is required for the scanning of the numerals, that is, the numeral is divided, according to FIG. 5, into a number of partial surface areas $b_{x,y}$. The upper track *o* corresponds to the ordinate value of eleven (11), the middle track *m* corresponds to the ordinate values of eight (8); and the lower track *u* corresponds to the ordinate value of five (5), all as shown on FIG. 5.

To each of these partial surface areas $b_{x,y}$ one intersecting point $P_{x,y}$ of the resistor arrangement (FIG. 1*a*) is assigned, and the arrangement is made in such a way that a fixed potential $U'_{x,y}=U_0$ is imprinted upon those points $P_{x,y}$ whose associated partial surface area $b_{x,y}$ exceeds a predetermined blackening content. The other points of the resistor arrangement are not imprinted with any potentials.

In FIG. 5 those partial surface areas $b_{x,y}$ which deliver a potential $U'_{x,y}=U_0$, are indicated by hatchlines, while the remaining partial surface areas $b_{x,y}$ are white.

Accordingly, when scanning the raster pattern only two discrete outputs will be obtained, namely $U_0$ and 0. These outputs may be obtained by means of the photocell arrangement as shown in FIG. 6, in which one photocell is provided for each partial surface area $b_{x,y}$.

Each photocell arrangement comprises the photocell F, the amplifier V and the limiter B. The limiter delivers a digital output signal corresponding to the scanning of the raster pattern, i.e. the two values $U'_{x,y}=U_0$ and $U'_{x,y}=0$. These two values, in the manner as described hereinbefore, depend upon the blackening of the scanned partial surface area $b_{x,y}$.

It is also possible to employ a smaller number of photocell arrangements; thus there may be provided one photocell for respectively each line or column, and the row of photocells or the pattern itself may be moved translatorily. Further it is possible to use one single photocell and to scan the pattern like a television raster. The respective black points are then retained in storage devices and the corresponding voltages or currents are then caused to act upon the network.

The above mentioned assignment of the photocell arrangements or respectively of the partial surface areas $b_{x,y}$ to the intersecting points $P_{x,y}$ of the resistor arrangement is effected in that respectively one output $U'_{x,y}$ is connected via a diode D*i* with an intersecting point $P_{x,y}$ in the manner as shown in FIG. 7. At the upper point of the diode D*i* the potential $U'_{x,y}$ exists, while at the lower point that particular potential which turns up at the corresponding point $P_{x,y}$ exists.

Accordingly, during the scanning of the raster pattern, the potential $U_0$ is imprinted upon all of those points $P_{x,y}$ whose associated partial surface areas $b_{x,y}$ are indicated by hatchlines in FIG. 5. To the other points $P_{x,y}$ of the resistor arrangement no potentials are imprinted by the photocell arrangements. Since, the fixed potential zero is applied to the periphery of the resistor arrangement a potential field is effected by the scanned numeral, so that upon the scanning, this figure will be simulated within the resistor arrangement. This is the first step in recognizing the numerals.

The fact that instead of the direct evaluation of the quantized potential conditions the character is at first simulated in the potential field, and that this potential field is then utilized for the character recognition purpose, bears the advantage that the potential field with respect to each individual point, due to the potential conditions thereof, offers more statements than the arrangement according to FIG. 5 giving only the two statements $U'_{x,y}=U_0$ and $U'_{x,y}=0$.

EVALUATION OF THE POTENTIAL FIELD

The second step in recognizing the numerals now consists in the evaluation of the potential field, that is, an examination is carried out as to whether the shape elements L, R, or G are within the potential field.

FIG. 8 shows the coupling diodes D*i* of one line of resistors (FIG. 7), which line corresponds for example, to the checking track *o* (FIG. 3). At the upper points of the diodes D*i* there will exist the potentials $U'_{1,y}$, $U'_{2,y}$ . . . $U'_{5,y}$, and at the lower points thereof there will exist the potentials $U_{1,y}$, $U_{2,y}$ . . . $U_{5,y}$.

Electronic circuit elements which, in FIG. 8, are symbolically represented as rotary switches D*r*, are employed for determining the potential values $U_{x-1}$, $U_x$, $U_{x+1}$ as well as $U'_x$ at three successive points along one checking track since the checking has to be effected in a cyclical fashion. The rotary switches are so connected with the resistor arrangement that three successive points in the *x*-direction may be read out or checked concurrently. Thus the first contact of the rotary switch D*r*1 is connected with the point $P_{1,y}$, while in the rotary switches D*r*2 and D*r*4 the first one, and in the rotary switch D*r*3 the first two contacts are dead. Since all of the four rotary switches rotate synchronously, the first comparison of voltage can only take place in the third position of the rotary switches. In this position the points $P_{1,y}$ . . . $P_{3,y}$ are connected with the corresponding rotary switches, so that the required checking of the above conditions (1) . . . (4) may be carried out. The rotary switch D*r*4 is connected with the amplifier point $U'_{x,y}$; and it thus serves the determination of the shape element G.

Appropriately, the rotary switches D*r*, which are symbolically shown in FIG. 8, may be electronic gating circuits, which are actuated in a time successive manner. Conventional examples of five such gating circuits AA, BB, CC, DD and EE are shown in FIG. 9.

The potentials $U_{x+1}$, $U_x$ and $U_{x-1}$, which are determined at the outputs of the rotary switches D*r*1 . . . D*r*3 (FIG. 8) are applied to the transistor arrangement as shown in FIG. 10. This arrangement combines these potentials for the above conditions (1) . . . (4) and applies pulses to the lines L or R respectively. The mode of operation of this arrangement will be understood from the following explanation. The two outputs for $U_{x+1}$ and $U_{x-1}$ are connected in opposition across the two resistors R1 and R2. The connecting point of the two resistors is applied to the base electrode of the transistor T1. The output for the potential $U_x$ is applied to the emitter of the transistor T1. In this way an output signal is applied to the two-input coincidence gate K1 whenever $U_x > \frac{1}{2}(U_{x-1}+U_{x+1})$, (transistors of the p-n-p type are assumed). It will be readily understood by those skilled in the art that n-p-n type junction transistors may alternatively be employed, with corresponding changes in the polarities of the potential applied to the several electrodes thereof along with other changes which are well understood by those skilled in the art. The coincidence gates K1, K2 are of known type and require the simultaneous application of a voltage upon both inputs thereof in order to render the gate conducting. If, furthermore $U_{x+1} > U_{x-1}$, then the transistor T2 is capable of conducting, so that a second signal will be applied to the coincidence gate K1. This signal will then cause the opening of the gate circuit K1 and the application of an identification signal for the shape element L to the storage device $S_L$.

The output signal of the transistor T1 is concurrently applied to the coincidence gate K2, which will be opened whenever $U_{x-1} > U_{x+1}$ and, consequently, the transistor T3 conducts. The identification signal appearing at the gate K2 for the shape element R will then be fed to the storage device $S_R$.

As will be seen from FIG. 2 of the drawings, the potentials $U_{x+1}$, and $U_{x-1}$, need not be obtained for the middle checking track but only the potential $U_x$, as well as the potential $U'_x$, for determining the shape element G. In FIG. 11 the circuit arrangement for obtaining the shape element G with the conditions $U_x = U_0$ and $U'_x < U_0$ is shown. The potential delivered by a photocell F upon scanning of a black area is amplified by the amplifier V. The amplified potential is applied via the limiter B and diode to the point $P_{x,\,y}$ of the resistor arrangement. The rotary switches Dr2 and Dr4 effect a checking of the potentials existing at the two terminals of the diodes. The potential $U'_x$ is applied to the base electrode of the transistor T4, to whose emitter is applied the potential $U_0$. Accordingly the transistor T4 conducts whenever $U'_x < U_0$, i.e. when the corresponding photocell performs the scanning of a white raster field. Upon conduction of the transistor T4, a signal will be applied to the coincidence gate K3.

The potential $U_x$ as sampled by the rotary switch Dr2 is applied to the emitter of the transistor T5, to whose base electrode is applied a somewhat lower potential than $U_0$. In this way the transistor T5 is permitted to conduct, when $U_x \geqq U_0 - \Delta U_0$, and to transmit an output signal to the K3 which opens and delivers an identification pulse for the shape element G to the storage device $S_G$.

Accordingly, an identification signal for recognizing the shape element G is produced if, and only if, the above conditions (5) and (6) are met satisfactorily.

In FIG. 12 of the drawings a translator is shown which, in accordance with the identification signals of the three checking tracks *o, m* and *u* produces the output signals for the recognized numerals 0 . . . 9. This translator substantially consists of coincidence gates, the input leads of which, in accordance with Table I, are connected with the storage devices or the outputs thereof. Whenever the storage devices show an absence of an input signal in all three checking tracks the numeral "1" is indicated. K*a* is an "and" gate which conducts or produces a signal only in the absence of signals on all 3 inputs. This is symbolically denoted in FIG. 12 by the three input arrows $\overline{L}$, $\overline{R}$, and $\overline{G}$ at the coincidence gate K*a* for the numeral "1."

RECOGNITION OF NUMERAL "2"

Following this general description of the invention there will now be described the recognition of the numeral "2" with reference to FIGS. 5 through 12:

On the lines $y=2$ and $y=3$ (FIG. 5), the partial surface areas $b_{5\,.\,.\,.\,11}$, and on the line $y=4$, the partial surface areas $b_{5\,.\,.\,.\,7}$, and so on, the hatch-lines indicate when the blackening has exceeded a predetermined threshold value. Consequently, at the outputs of each of the photocells F (FIG. 6), which are coupled to these partial surface areas, the scanning potential $U'_{x,\,y} = U_0$ will appear. Accordingly, this potential will be imprinted upon the points $P_{x,\,y}$ of the resistor network (FIGS. 1 and 7) assigned to these outputs.

The potential field in the resistor arrangement derived as a result of the foregoing will now be checked.

*Checking upper track o.*—The rotary selectors $Dr_1$ . . . $Dr_4$ (FIG. 8) start to run synchronously. In the first and second position no evaluation is effected because in the rotary selector $Dr_2$ the first one, and in the rotary selector $Dr_3$ the first two contacts are dead. In the third position, the selector $Dr_1$ is connected to the point $P_{3,\,11}$, the selector $Dr_2$ to the point $P_{2,\,11}$, and the selector $Dr_3$ to the point $P_{1,\,11}$.

Thus the potential conditions of these three points may be compared with one another. As will be seen from FIG. 5 the rise of potential is approximately linear up to the point $P_{3,\,11}$, so that no statement can yet result as to whether the shape element L or R exists.

In the next position of the rotary selectors $Dr_1$ . . . $Dr_3$ the three points $P_{2,\,11}$ . . . $P_{4,\,11}$ are checked. Again in this case an unambiguous statement as to the existence of a shape element L or R is not obtained because of the linear rise in potential.

However, an unambiguous statement regarding the shape element L results when the three selectors $Dr_1$ . . . $Dr_3$ are connected to the points $P_{7,\,11}$ . . . $P_{9,\,11}$, because $$U_{7,\,11} < U_{8,\,11} < U_{9,\,11}$$

and $$\tfrac{1}{2}(U_{7,\,11} + U_{9,\,11}) < U_{8,\,11}$$

Due to the presence of these potential conditions the coincidence gate $K_1$ in FIG. 10 will open, so that as a result a storage pulse will be applied to the storage device $S_L$.

*Checking lower track u.*—When performing the checking on track *u* (FIGS. 8 and 10) the same processes as described above in connection with the checking track *o* will be repeated. Up to the position $P_{4,\,5}$ . . . $P_{6,\,5}$ the rise in potential is a linear one, so that no statements can yet result as to whether or not the shape element L or R exists.

On the other hand, when checking the potentials at the points $P_{7,\,5}$ . . . $P_{9,\,5}$, the shape element R may be recognized, because now the requirements $$U_{7,\,5} > U_{8,\,5} > U_{9,\,5}$$

and $$\tfrac{1}{2}(U_{7,\,5} + U_{9,\,5}) < U_{8,\,5}$$

are met.

Accordingly, in this position of the selectors $Dr_1$ . . . $Dr_3$ the coincidence gate $K_2$ in FIG. 10 opens and delivers a signal to the storage device $S_R$.

On both of the checking tracks the conditions for a closed field margin corresponding to the shape element G $$U_x = U_0$$

and $$U'_x = 0$$

do not exist and are never obtained.

*Checking middle track m.*—The middle checking track is of no importance to the recognition of numeral "2," because it only serves for distinguishing between the numerals 0 and 8, as has already been mentioned.

As may be seen from Table I, this checking track checks only for the presence of the shape element G which exists in the numeral 0. From FIG. 5 it will be easily seen that the conditions $$U_x = 0$$

and $$U'_x = 0$$

which are required for the shape element G, are not met at any point of the checking track *m*.

Since the storage devices $S_L$ and $S_R$, for the checking tracks *o* and *u* respectively, are activated and as shown in FIG. 12, they are connected to gate $K_b$; numeral "2" is recognized.

An arrangement may also be made whereby the points $P_{x,y}$ corresponding to white partial surface areas $b_{x,y}$ are imprinted with a fixed potential.

In the foregoing the character recognition is described with reference to the simulation of the characters within a potential field, and the evaluation thereof.

Since, for maintaining the imprinted potential $U_0$ a predetermined current $I_{x,y}$ is required, the latter may also be used for character recognition, since characteristic associations exist between the flow of current within the potential field and the shape elements of the characters. This will now be considered with reference to FIG. 13.

According to the laws of potential theory, the current $I_{x,y}$, flowing into a point $P_{x,y}$, corresponding to a blackened partial surface area $b_{x,y}$, is greater the more exposed this partial surface area projects into non-blackened partial surface area. In accordance therewith, characteristic current stages for the numerals 0 . . . 9, may be determined which may then be used for recognizing the respective numerals. Thus, for example, it is sufficient to provide the following five current conditions:

| current conditions | the blackened partial surface area under consideration— |
|---|---|
| 0=nearly no current | is strongly screened. |
| 1=small current | is lying in an oblong shaped portion of the character. |
| 2=medium current | is a screened corner of the character. |
| 3=strong current | is an exposed corner of the character. |
| 4=very strong current | is a freely disposed end point of the character. |

The term "screened" implies that many black fields exist in the neighbourhood. In FIG. 13 the numerals are provided with the current condition identification indicia. The blackening of the numerals will provide an approximate indication of the current densities. Of course, the division into current conditions may also be set up more finely, so that it will be rendered possible to e.g. also distinguish between straight and bent line portions.

In the following Table II there are shown the current conditions assigned to the numerals 0 . . . 9 according to FIG. 13 of the drawings.

TABLE II

| Numeral | Current stages | | | | |
|---|---|---|---|---|---|
| | 0 | 1 | 2 | 3 | 4 |
| 1 | 0 | 2 | 0 | 2 | 1 |
| 2 | 0 | 2 | 0 | 3 | 0 |
| 3 | 0 | 4 | 1 | 2 | 0 |
| 4 | 0 | 1 | 1 | 2 | 2 |
| 5 | 0 | 3 | 3 | 1 | 0 |
| 6 | 0 | 2 | 0 | 1 | 0 |
| 7 | 0 | 2 | 2 | 1 | 1 |
| 8 | 1 | 2 | 0 | 0 | 0 |
| 9 | 0 | 2 | 0 | 1 | 0 |
| 0 | 0 | 1 | 0 | 0 | 0 |

From this Table II it will be seen that nearly all figures differ from each other according to the distribution of the current intensities and, thus, may be recognized. Only the two numerals 6 and 9 cannot be readily distinguished from one another, but they will become distinguishable e.g. when examining in what relation the point with the current condition 3 is to the center of gravity or concentration of the numeral.

The evaluating arrangement is e.g. capable of measuring the currents $I_{x,y}$, flowing into the points $P_{x,y}$, of classifying these into the different areas of current intensity, and of counting how many times per numeral the different stages appear. The particular distribution thereof will then be characteristic for the respective numeral. This distribution is fixed with respect to distortions (twistings) and displacements of the shape. The fixed distribution with respect to enlargements or reductions in size of the character may be accomplished in that the condition for the current intensity $I_{x,y}$ is set up relative to the appearing maximum and minimum value. In this way a fixed distribution with respect to changes in the type of numeral will also result.

The measurement of the current intensities $I_{x,y}$ may be carried out with the aid of conventional means. A corresponding example for the measurement is shown in FIG. 14.

In this case the limiter output $U'_{x,y}$ is connected on one side of a resistor $R_3$ with the corresponding point $P_{x,y}$ of the resistor coordinate network. The point A is connected with the emitter of transistor T6, while point B of the resistor is connected to the base electrode of said transistor. The collector electrode of the transistor T6 is coupled, across the resistor R4, to a potential which is negative with respect to potential $U'_{x,y}$.

Upon scanning a white partial surface area $b_{x,y}$ (FIG. 5) the same potential will exist on both sides of the resistor R3, because no current is flowing. The transistor T6, therefore, is blocked. However, upon scanning a blackened partial surface area $b_{x,y}$, a certain current will flow into the respective point $P_{x,y}$ of the resistor arrangement, for maintaining the constant potential $U_0$.

Since the intensity of the current depends upon the potential condition of the neighbourhood of the point under consideration different voltage drops over the resistor R3 are produced. The transistor T6 is thus caused to conduct more or less current. Consequently, also the current flowing across the resistor R4 has different intensities, corresponding to the above mentioned current stages 0 . . . 4. Because of this different potentials will appear at point C.

The point C, therefore, may be connected with a logic circuit in which the various conditions are evaluated character recognition. This logic circuit also serves to determine the repetition rate of the individual conditions per character. The logic circuits, as required to this end are sufficiently known in the art and, therefore, do not need to be particularly described herein.

The described automatic character recognition methods are rather insensitive to type variations. Likewise it is easy to adjust to any differences in size when first determining (e.g. with the aid of special kinds of photocells) the upper or lower margin of the characters and, thereafter, adjusting the photocells to the actual scanning operation.

While the invention has been described in connection with recognition of numerals, it will be understood that it is equally effective to recognize other characters such as letters of the alphabet or any other type of indicia.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A character recognition system comprising an impedance plane, means for maintaining the periphery of said plane at a fixed electrical potential, means for sensing portions of the outline of a character to be recognized, means for deriving electrical potentials differing from said fixed potential from said sensing means, means for applying said potentials to separate coordinate points of said plane, respectively, whereby said plane will provide a resultant potential field, means for scanning predetermined coordinate points in a plurality of lines across said plane for detecting the potentials thereof, and means for comparing said detected potentials for deriving an output corresponding to said character.

2. A character recognition system as claimed in claim 1, wherein said plane comprises a plurality of resistors arranged in a coordinate array defining a plurality of vertical and horizontal rows.

3. A character recognition system as claimed in claim 1, wherein said sensing means comprises ray-energy responsive elements.

4. A character recognition system as claimed in claim 1, wherein said means for deriving electrical potentials from said sensing means comprises amplifier-limiter elements.

5. A character recognition system as claimed in claim 1, wherein said means for applying said potentials to said plane comprise a plurality of unidirectional current carrying elements interposed intermediate said coordinate points and said means for deriving electrical potentials, respectively.

6. A character recognition system as claimed in claim 1, wherein said comparison means comprises a plurality of storage devices each adapted to store information regarding particular parameters of scanned characters, a separate coincidence gate element for controlling the operation of each of said storage devices, switch means intermediate said scanning means and said gate elements for controlling operation thereof, there being at least two of said switch means coupled to each of said gate elements to effect operation thereof.

7. A character recognition system comprising means for electrically simulating a character shape as a predetermined potential in a potential field, means for determining spatial potential gradients in said field, and means for evaluating said gradients whereby the character is unambigously determined.

8. A character recognition system as claimed in claim 7 in which the means for determining said gradients includes the constitution of spatial derivatives.

9. A character recognition system comprising an impedance matrix means for electrically simulating a character shape as a first potential in said matrix, means for maintaining the periphery of said matrix at a predetermined second potential, means for determining spatial potential gradients in said matrix, and means for evaluating said gradients whereby the character is unambiguously indicated.

10. A character recognition system comprising a resistor network having a first fixed potential at its periphery, means for electrically simulating a character as a fixed second potential in said network, means for determining potential gradients in said network, and means for evaluating said gradients whereby the character is unambiguously indicated.

11. A character recognition system as claimed in claim 10 in which the means for evaluating said gradients includes the approximate constitution of spatial derivatives.

12. A character recognition system comprising a coordinate network of resistors, means for maintaining the periphery of said network at a predetermined potential, means for impressing potentials differing from said predetermined potential on intersecting points of the resistor network corresponding to respective partial areas of the character, means for determining the changes in potential between coordinate points in said network, means for evaluating said changes in potential, means for translating the evaluation into indicia corresponding to the character.

13. A character recognition system comprising a coordinate network of resistors maintained at a first potential, transducer means adapted to scrutinize discrete areas of a character and give potentials relative to indicia on said areas, means for assigning said potentials from said discrete areas on a one to one basis to corresponding intersecting points in said network to induce a potential field in said network, means for scanning said network and said transducer potentials in a plurality of tracks and deriving potentials therefrom, means for comparing said last mentioned potentials within each track and determining a shape element therefrom, means for translating the shape elements derived at said tracks into an indication of the character.

14. A character recognition system comprising a coordinate network of resistors maintained at a first potential, a plurality of transducers coupled to intersecting points in said network on a one to one basis adapted to scrutinize discrete areas of a character and give second potentials relative to indicia thereon, unidirectional current carrying means connected between each transducer and its associated intersecting point, selector means for scanning transducer potentials and network points in a plurality of tracks and deriving potentials therefrom, means for comparing the derived potentials within each track and determining a shape element, means for storing said shape element, means for translating the stored shape element of all of the tracks into an indication of the character.

15. A character recognition system as claimed in claim 14 in which the selector means comprises a plurality of cyclically rotating switches adapted to scan successive intersecting points on a track and successive transducer potentials associated with those points.

16. A character recognition system as claimed in claim 14 in which the transducer includes an amplifier-limiter.

17. A character recognition system comprising a coordinate network of resistors grounded at its periphery, a circuit coupled to each intersecting point in said network, said circuit comprising a diode, a limiter, an amplifier, and a photocell respectively serially connected, the photocells being adapted for reading discrete areas of characters whereby each discrete area corresponds to an intersecting point in said network, a plurality of tracks in said resistor network, cyclically rotating reading means for each track adapted to read successive intersecting points and successive limiters, a shape determiner comprising transistors, "and" gates, and storage devices coupled to each of said reading means for determining and storing a shape element, a translator comprising a plurality of "and" gates and coupled to all of the shape determiners for indicating the recognized character.

18. A character recognition system comprising means for electrically simulating a character shape as predetermined potential in a potential field, means for measuring the current necessary to simulate said character and means for evaluating said currents whereby the character is unambiguously determined.

19. A character recognition system comprising means for electrically simulating a character shape as a predetermined potential in a potential field, means for measuring the currents in said field, and means for evaluating said currents whereby the character is unambiguously determined.

20. A character recognition system comprising means for electrically simulating a character as a first potential in an impedance matrix, means for keeping the periphery of said matrix at a predetermined second potential, means for measuring the currents necessary to simulate said character and means for evaluating said currents whereby the character is unambiguously determined.

21. A character recognition system comprising a coordinate network of resistors, means for maintaining the periphery of said network at a predetermined potential, means for impressing potentials differing from said first potential on intersecting points of the resistor network corresponding to respective partial areas of the character, means for measuring the current necessary for maintaining the impressed potentials on intersecting points of the resistor network, means for evaluating said currents, and means for translating the evaluation into indicia corresponding to the character.

References Cited in the file of this patent

UNITED STATES PATENTS

| | | |
|---|---|---|
| 2,616,983 | Zworykin | Nov. 4, 1952 |
| 2,905,927 | Reed | Sept. 22, 1959 |
| 2,907,824 | Peek | Oct. 6, 1959 |
| 2,924,812 | Merritt et al. | Feb. 9, 1960 |
| 3,016,518 | Taylor | Jan. 9, 1962 |